United States Patent
Gasbarro

(12) 
(10) Patent No.: US 9,683,773 B1
(45) Date of Patent: Jun. 20, 2017

(54) DUAL CASCADE POULTRY CHILLER

(71) Applicant: Remington Holdings, LLC, Columbus, OH (US)

(72) Inventor: Geno N. Gasbarro, Columbus, OH (US)

(73) Assignee: Remington Holdings, LLC, Columbus, OH (US)

( * ) Notice: Subject to any disclaimer, the term of this patent is extended or adjusted under 35 U.S.C. 154(b) by 0 days.

(21) Appl. No.: 15/146,996

(22) Filed: May 5, 2016

(51) Int. Cl.
| | |
|---|---|
| A22B 5/08 | (2006.01) |
| F25D 13/06 | (2006.01) |
| A22C 21/00 | (2006.01) |
| A23B 4/06 | (2006.01) |
| A22C 21/02 | (2006.01) |
| A22C 21/06 | (2006.01) |

(52) U.S. Cl.
CPC .......... *F25D 13/06* (2013.01); *A22C 21/0053* (2013.01); *A22C 21/02* (2013.01); *A22C 21/06* (2013.01); *A23B 4/06* (2013.01); *F25B 2700/04* (2013.01)

(58) Field of Classification Search
CPC ................................ A22B 5/08; A01K 13/002
USPC ... 452/52, 53, 106, 149, 150, 155–157, 198, 452/81, 173, 114, 120, 123, 71, 74–78, 452/119
See application file for complete search history.

(56) References Cited

U.S. PATENT DOCUMENTS

| | | | | |
|---|---|---|---|---|
| 4,965,911 A | * | 10/1990 | Davey ................. | A22B 5/0082 134/199 |
| 5,882,253 A | * | 3/1999 | Mostoller .......... | A22C 21/0061 452/173 |
| 6,083,463 A | * | 7/2000 | Dobbs ..................... | C02F 1/76 210/198.1 |
| 6,142,861 A | * | 11/2000 | Buhot ..................... | A22B 5/08 452/173 |

* cited by examiner

*Primary Examiner* — Richard Price, Jr.
(74) *Attorney, Agent, or Firm* — Jason H. Foster; Kremblas & Foster

(57) ABSTRACT

An apparatus for chilling plucked poultry carcasses before evisceration. A reservoir, which can be formed in a housing, retains a chilling liquid. A first plenum is disposed above the reservoir and a second plenum is disposed above the reservoir. The plenums receive at least some of the chilling liquid from the reservoir. The second plenum is spaced from the first plenum and defines a gap between the first and second plenum through which the conveyor passes. A chilling liquid pump pumps liquid from the reservoir to one or both plenums, whereby the chilling liquid overflows out of the first and second plenums, cascades downwardly onto at least some of the plurality of carcasses and flows into the reservoir.

12 Claims, 6 Drawing Sheets

DUAL CASCADE POULTRY CHILLER

CROSS-REFERENCES TO RELATED APPLICATIONS (Not Applicable)

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The invention relates generally to poultry processing and more specifically to a device for chilling poultry carcasses during processing.

It is known to chill the carcasses of poultry, including such common birds as chickens, turkeys and Cornish hens, as one of the final steps in a poultry processing method. It is also known to chill pieces of butchered poultry carcasses in the same manner. In a common chilling system, a large bath of water that is at a lower temperature than the birds receives the poultry carcasses and/or pieces at the end of the poultry processing system. The carcasses and/or pieces are placed in the water, and a mechanism, such as an auger or a mechanically-conveyed paddle system, slowly conveys the carcasses and/or pieces along the length of the bath. The water in the chiller bath contacts most or all outer surfaces of the carcasses and/or pieces, and thereby removes thermal energy.

In a conventional poultry processing system, it is common to pluck the feathers from a bird as one of the first processing steps, typically just after killing the bird and just prior to removing the organs and the muscle and muscle/bone combinations (e.g., breasts, wings, drumsticks) from the bird. The plucking process typically begins by heating the outer surface of the bird substantially to permit removal of the feathers from the skin of the bird. The bird is typically heated by submerging in a tub of hot water, a poultry processing process called scalding, or pouring or spraying hot water or steam onto the bird's exterior. The hot water loosens the connection of the feathers to the skin, and permits complete feather removal. However, by heating the bird's outer surface, the skin and muscle are warmed enough to permit bacteria to be highly active during the remainder of the process, and sufficiently to permit fat and other temperature-dependent materials to more readily leave the muscle and soft tissue of the bird.

The problem of bacterial activity and loss of mass creates difficulties in poultry-processing systems.

BRIEF SUMMARY OF THE INVENTION

Disclosed herein is an apparatus for chilling plucked, substantially whole poultry carcasses. In a preferred embodiment, the carcasses are held in a conveyor that transports the carcasses by suspending each carcass above a ground surface. The apparatus includes a reservoir retaining a chilling liquid, which can be formed in a housing. A first plenum is disposed above the reservoir and receives at least some of the chilling liquid from the reservoir. A second plenum is disposed above the reservoir and receives at least some of the chilling liquid from the reservoir. The second plenum is spaced from the first plenum and defines a gap between the first and second plenum through which the conveyor passes. A chilling liquid pump is in fluid communication with the reservoir and at least one of the plenums. It is contemplated that two pumps are used, one for each plenum, but only one is required. The chilling liquid pump is configured to pump chilling liquid from the reservoir to at least one of the plenums, whereby the chilling liquid overflows out of the first and second plenums. The overflowing liquid cascades downwardly onto at least some of the plurality of carcasses and flows into the reservoir.

Further disclosed is a method for chilling poultry carcasses that are held in the conveyor. The method comprises plucking the carcasses and then chilling the carcass by passing it through a chiller. The chiller has a reservoir retaining a chilling liquid, first and second plenums and a pump. The first plenum is disposed above the reservoir and receives at least some of the chilling liquid from the reservoir. The second plenum is disposed above the reservoir and receives at least some of the chilling liquid from the reservoir. The second plenum is spaced from the first plenum and defines a gap between the first and second plenum through which the conveyor passes. The chilling liquid pump is in fluid communication with the reservoir and at least one of the plenums. The chilling liquid pump pumps liquid from the reservoir to one or both of the plenums so that the chilling liquid overflows out of the plenums and cascades downwardly onto the carcass. After passing through the chiller, the carcass is eviscerated. In a more preferred embodiment, the step of drawing chilling liquid into the reservoir further comprises drawing liquid from an apparatus that cools the carcasses after evisceration.

Still further disclosed is a poultry processing system for carcasses that are held in a conveyor that transports the carcasses along a path from an upstream position to a downstream position. The system includes a plucking apparatus that is positioned along the path for removing substantially all feathers from at least one of the carcasses, and a chilling apparatus that is positioned along the path downstream of the plucking apparatus. The chilling apparatus includes a reservoir retaining a chilling liquid, first and second plenums and a chilling liquid pump. The first plenum is disposed above the reservoir and receives at least some of the chilling liquid from the reservoir. The second plenum is disposed above the reservoir and receives at least some of the chilling liquid from the reservoir. The second plenum is spaced from the first plenum and defines a gap between the first and second plenum through which the conveyor passes. The chilling liquid pump is in fluid communication with the reservoir and at least one of the plenums, and pumps chilling liquid from the reservoir to at least one of the plenums. The chilling liquid thereby overflows out of the first and second plenums, cascades downwardly onto the carcass, and flows into the reservoir. An eviscerating apparatus is positioned along the path downstream of the chilling apparatus, and the eviscerating apparatus eviscerates the carcass after the carcass has passed through the chilling apparatus. In a preferred embodiment, a second chilling apparatus is positioned along the path downstream of the eviscerating apparatus, and a fluid connection is formed between the second chilling apparatus and the chilling apparatus.

The apparatus cascades chilled water onto opposite sides of each carcass and does so after plucking and before evisceration. Thus, the bird is thereby chilled so that the evisceration process is improved, the mass of muscle is greater and the activity of bacteria is less during the remaining processing steps than without chilling.

Figure 1:
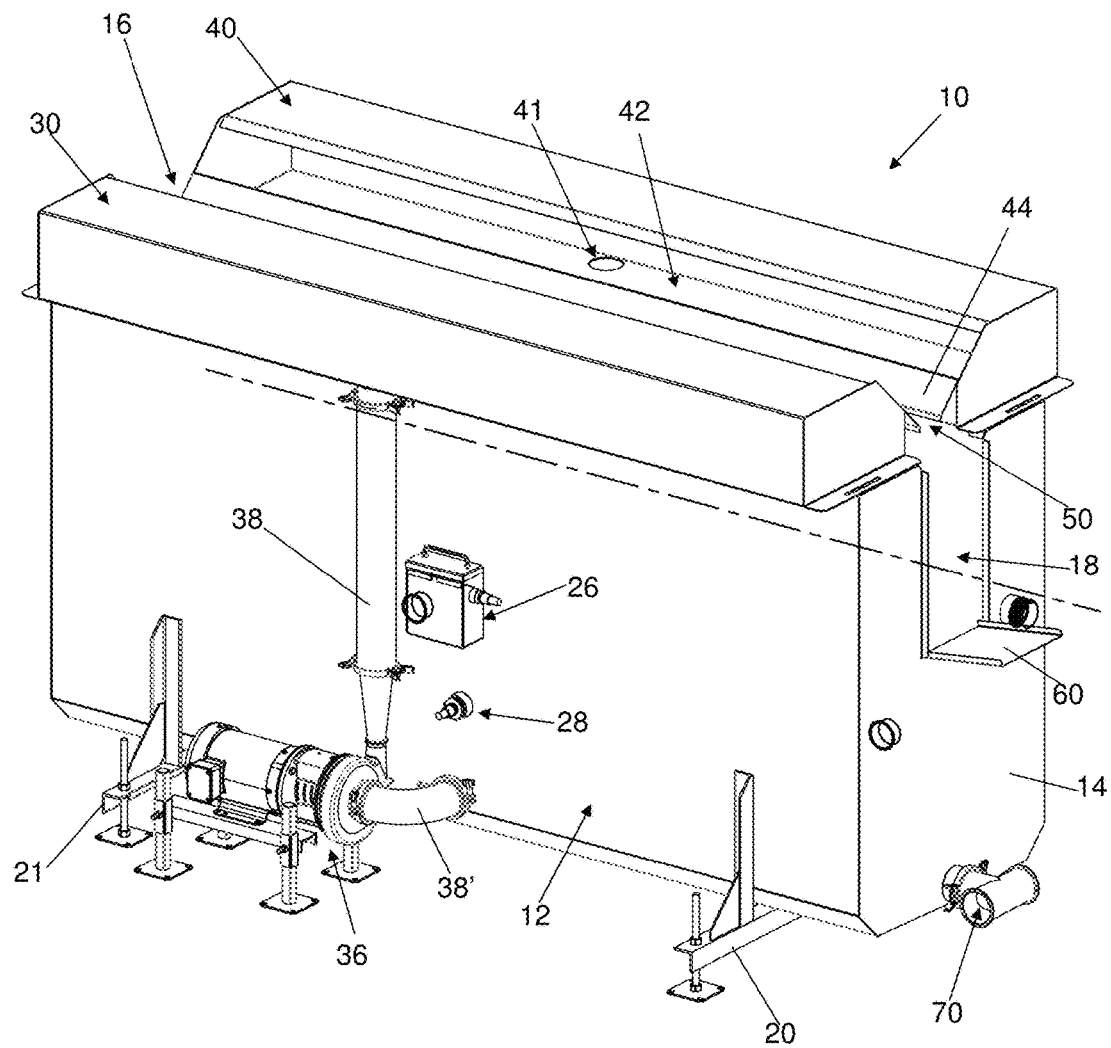
FIG. 1 is a left view in perspective illustrating an embodiment of the present invention.
Figure 2:
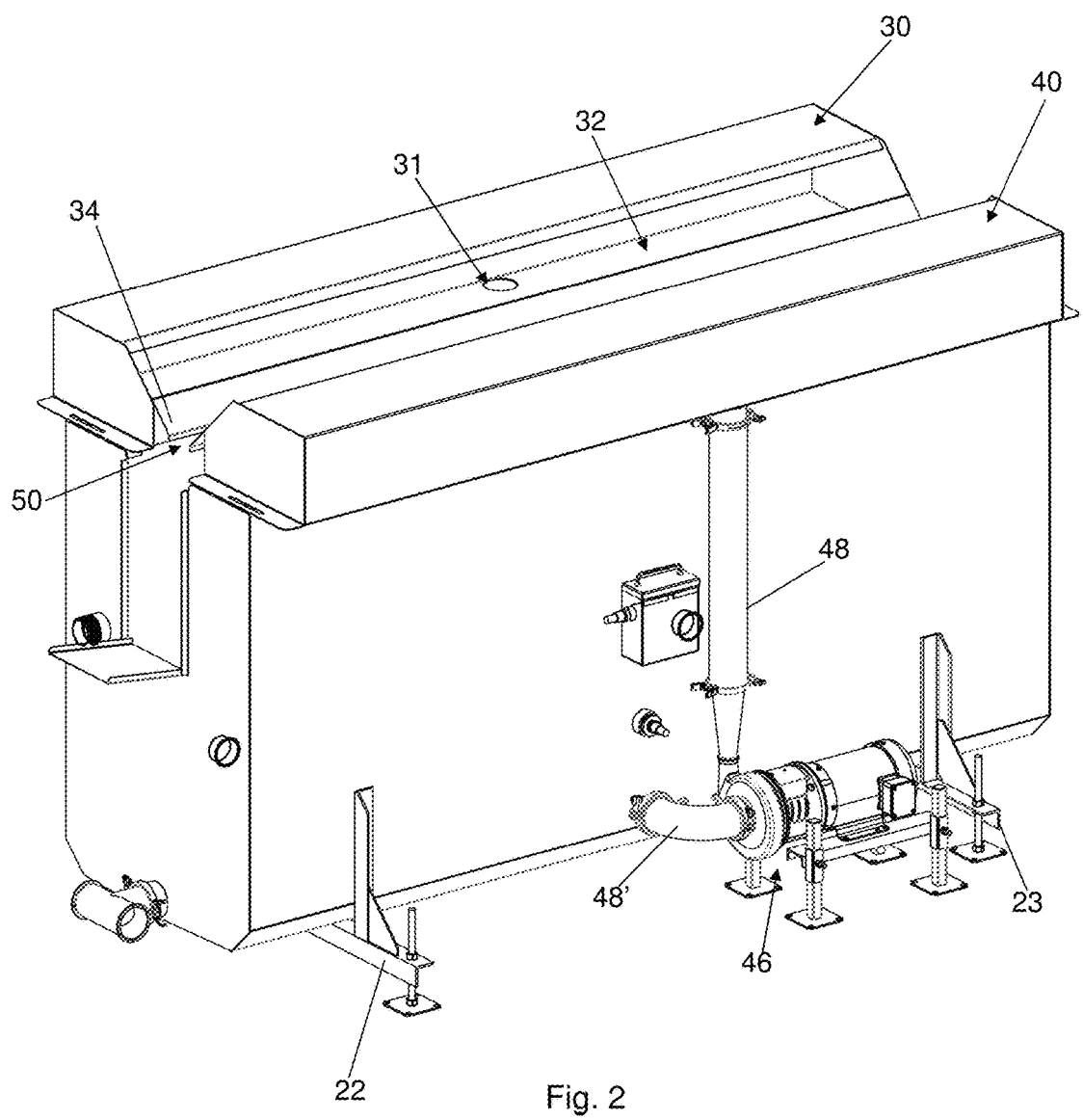
FIG. 2 is a right side view in perspective illustrating the embodiment of FIG. 1.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Figure 5:
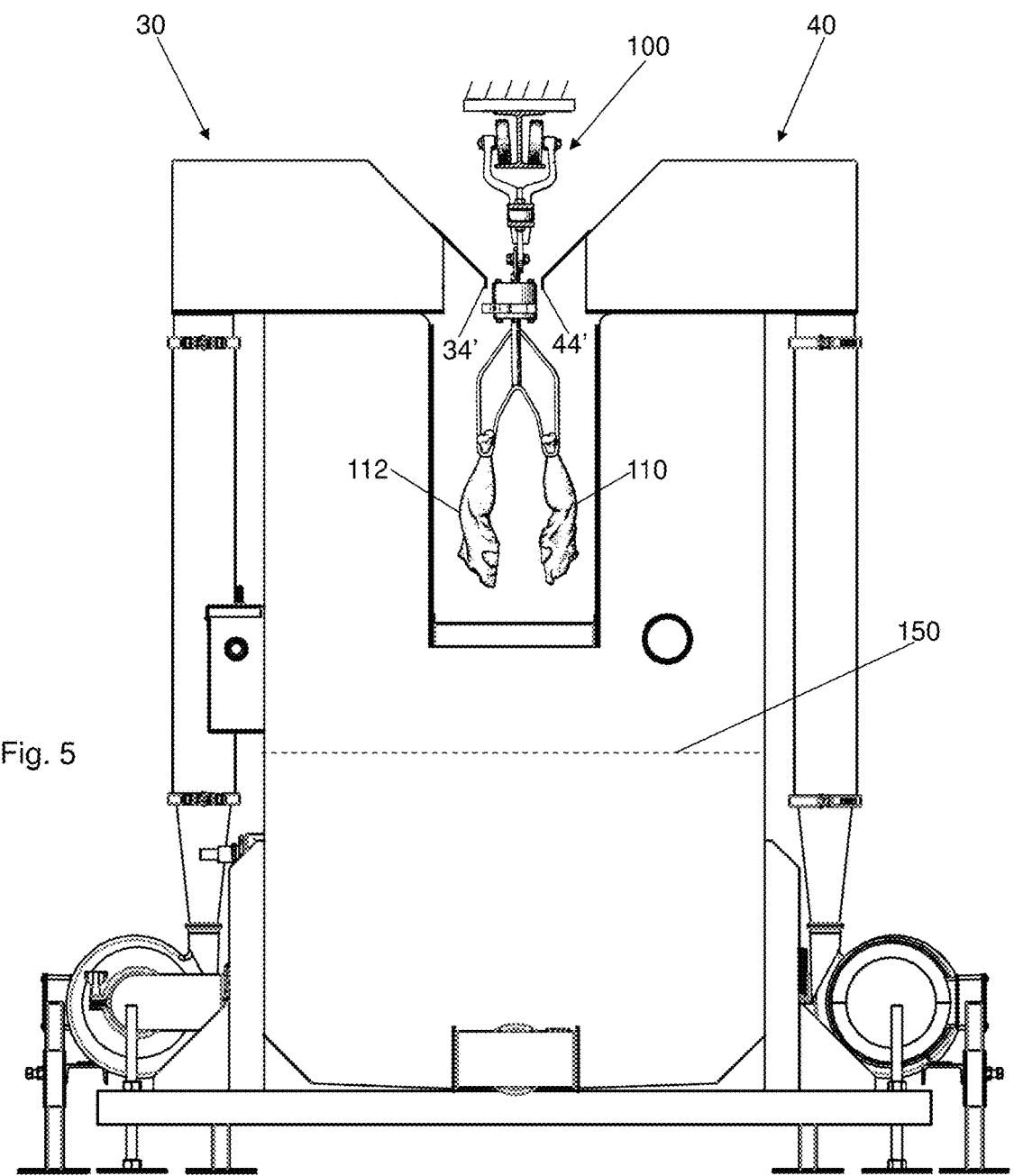
FIG. 5 is an end view illustrating the embodiment of FIG. 1 with the chain line in position.
Figure 6:
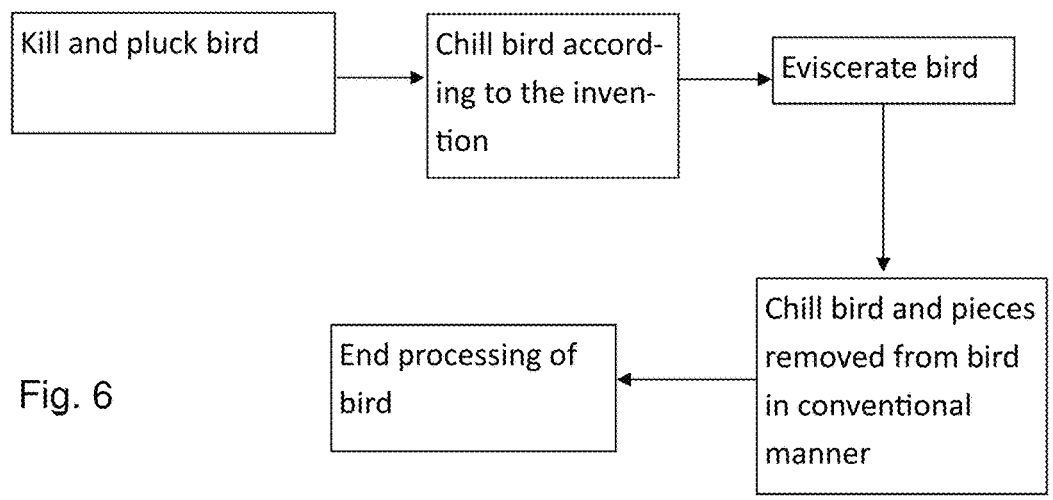
FIG. 6 is a flow chart illustrating a method of the present invention.

The chiller 10 shown in FIGS. 1-2 and 4-5 is preferably positioned in a poultry processing system, which is shown in FIG. 6 in schematic, flowchart format. Processing typically begins with killing the bird by removing its head, and then plucking the feathers from the bird. It is preferred that the chiller 10 is located in close proximity to the plucking mechanism, such as immediately downstream from the plucking equipment, so that after the plucking step the birds enter the chiller 10, preferably on a chain line. After chilling in the chiller 10, as described below, the bird is eviscerated and then chilled in a conventional manner, and the eviscerating and conventional chilling equipment is in close proximity to, such as immediately downstream of, the chiller 10. Thus, the chiller 10 is the apparatus the chain line enters after exiting the plucking equipment, and before entering evisceration equipment.

The chiller 10 is illustrated in FIGS. 1-2 and 4-5 having a housing 12 that is preferably made of stainless steel or other strong material, such as aluminum or a fiber-reinforced polymer composite. A reservoir 14 is defined by the lower portion of the housing 12, and preferably has four sidewalls and a floor that form a chamber in which any chilling liquid may be retained. Water is a preferred chilling liquid that is preferably contained within the reservoir 14, and the water may contain antimicrobial, antifreeze and/or other additives. The water is preferably at a temperature that is substantially lower temperature than the bird, and this temperature is preferably at most 60° Fahrenheit, more preferably no more than 50° F., and most preferably between 33 and 45° F. Of course, with other liquids or additives to water, the temperature could be below the freezing point of water.

The water is preferably maintained at a minimum and a maximum height, such as by conventional sensors 26 and 28 that extend through the walls of the housing 12 to detect the presence of water. Such sensors may be connected to a central computer (not shown) through wires or wirelessly that receives the signals from the sensors 26 and 28, and activates and de-activates a refilling mechanism, such as a refill pump (not shown) that is connected to a pipe 70, based on the programming of the computer. When the level of the water in the reservoir falls below the minimum level, the refill pump is activated to pump water into the reservoir 14. Conversely, when the level of the water in the reservoir 14 reaches the maximum level, the refill pump is de-activated to cease pumping water into the reservoir 14. Thus, the level of the water in the reservoir 14 is maintained between an upper and a lower limit. In a preferred embodiment, the pipe 70 is in fluid communication with the chilled water in a conventional chilling apparatus at the end of the poultry processing line so that chilled water from that apparatus is used to refill the reservoir 14 of the chiller 10.

Four legs 20-23 are mounted to the lower portions of the housing 12. Such legs 20-23 have leveling capabilities, such as threaded shafts mounted at one end to a floor-engaging plate that also threadingly engage the legs 20-23. Thus, the chiller 10 may be placed on a floor or other surface, such as the ground, and adjusted so that it is level.

Two cascading mechanisms 30 and 40 are formed on opposite sides of the chiller 10 and form a gap 50 therebetween to provide cascades of water from opposite sides of the reservoir 14. The cascading mechanism 30 includes a plenum 32, a waterfall plate 34 and a pump 36 to which a preferably flexible supply tube 38 and a return tube 38' are mounted. The cascading mechanism 40 includes a plenum 42, a waterfall plate 44 and a pump 46 to which a preferably flexible supply tube 48 and a return tube 48' are mounted. Each plenum is a container for liquid, such as water, and has four sides and a floor, and the sides and floor are sealed to retain liquid placed therein. The inner, facing sidewalls are the shortest of all sides so that, upon filling either plenum with a liquid, the inner side will overflow before water flows over any other side. Thus, when liquid fills either or both of the plenums 32 and 42, the addition of any more liquid causes the liquid to overflow the inner, facing sidewalls in the direction of the gap 50, which is where the waterfall plates 34 and 44 are mounted.

The waterfall plates 34 and 44 extend downwardly from the shortest sidewalls of the plenums 32 and 42, at an angle of about 30-60 degrees, and preferably about 45 degrees, from vertical and terminate at the edges 34' and 44', respectively (see FIG. 5). The terminal edges 34' and 44' of the waterfall plates are spaced from one another and form the gap 50 through which the chain line 100 passes. The width of the gap 50 is thus preferably at least about a few inches, but may be as much as about two feet. Preferably the gap 50 is about eight to about twelve inches wide.

The reservoir 14 contains a chilling liquid that communicates with the return tubes 38' and 48'. When operating, the pumps 36 and 46 continuously draw chilling liquid from the reservoir 14 and pump the liquid upwardly into the plenums 32 and 42 through the supply tubes 38 and 48, which enter through the apertures 31 and 41, respectively. The rate of pumping is sufficient to continuously supply the plenums 32 and 42 with water that overflows at the same rate as the water is supplied to the plenums 32 and 42. Water overflowing onto the waterfall plates 34 and 44 is guided by gravity and the angled waterfall plates 34 and 44 to the terminal edges 34' and 44', whereupon the water is released to fall downwardly toward and into the reservoir 14.

Figure 3:
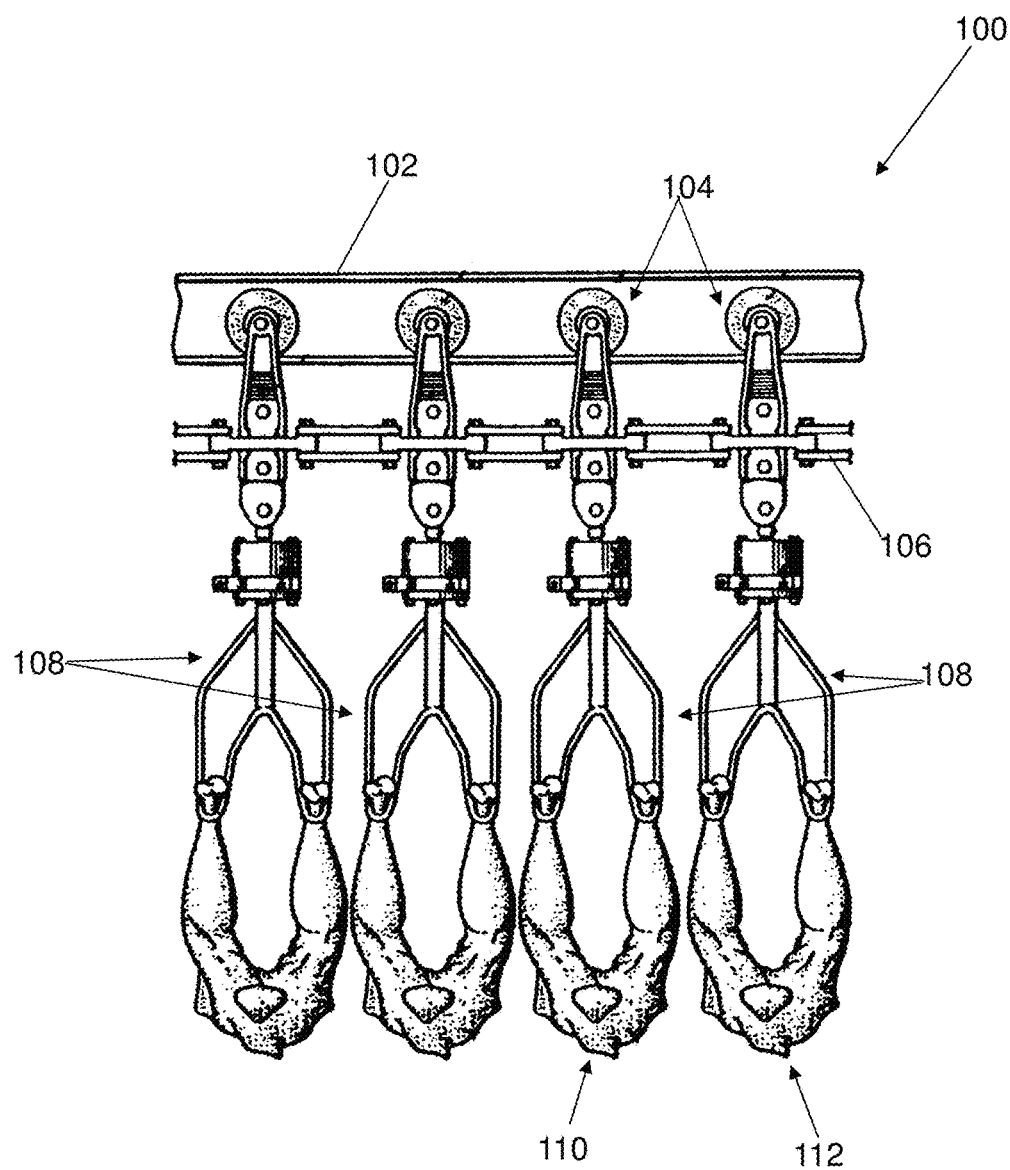
FIG. 3 is a side view illustrating a conventional chain line that suspends poultry carcasses above a ground surface.
Figure 4:
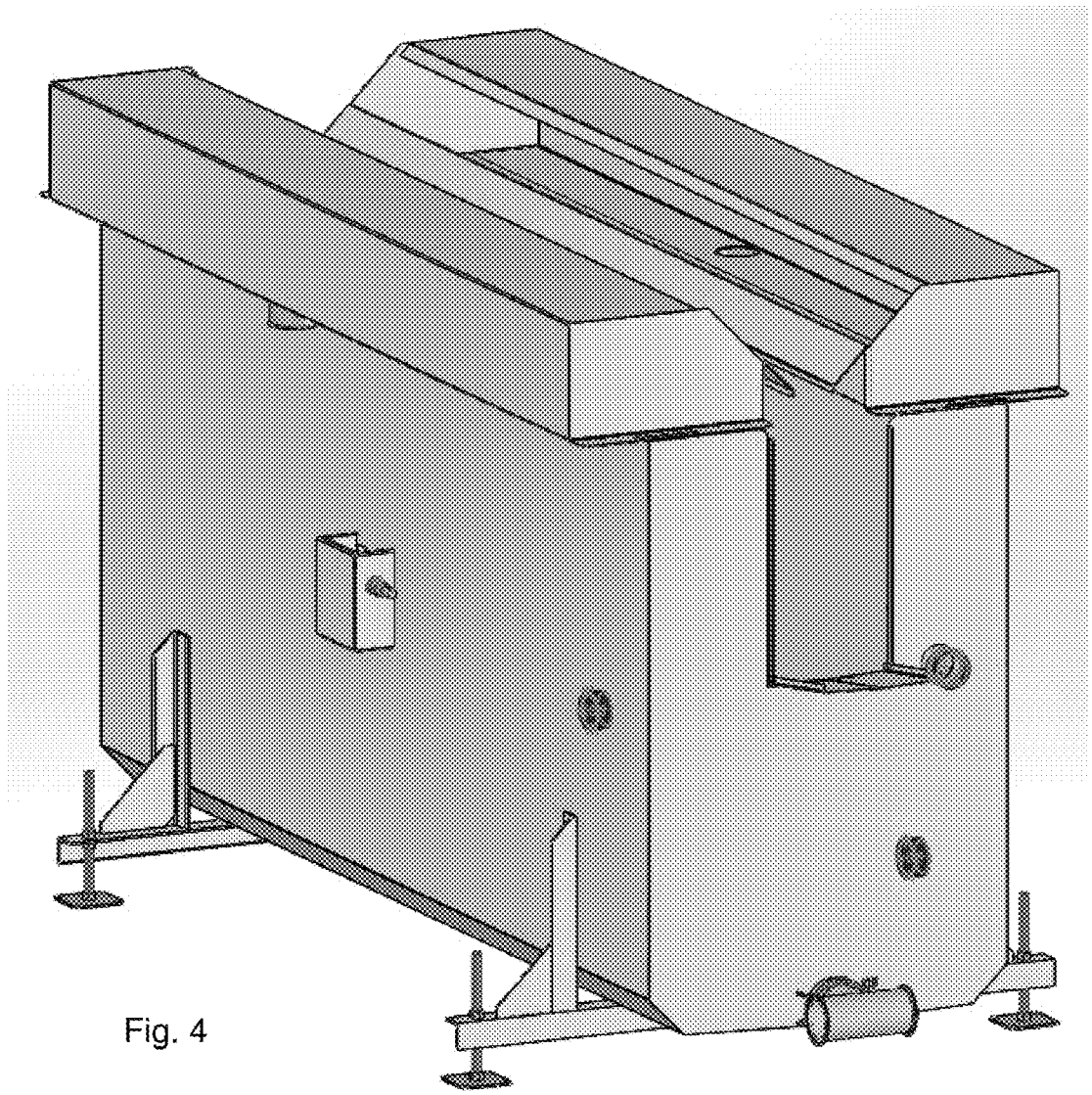
FIG. 4 is a left view in perspective illustrating the embodiment of FIG. 1 with some components removed for clarity in viewing the remaining components.

The conventional chain line 100 is shown in FIG. 3 having a support, such as the I-beam 102 mounted to a ceiling, a series of chains or cables that are suspended from the ceiling or some other strong support from which the mechanisms can be supported. The wheels 104 rest on opposite sides of the lower portion of the I-beam 102 and transfer the weight of the chain line and carcasses to the I-beam 102. A laterally-flexible chain 106 connects a plurality of holders 108 on the wheels 104, and maintains the holders 108 in the same horizontal proximity to one another as they progress along the beam 102. Because the carcasses 110 and 112 may be mounted to the holders 108 as shown in FIG. 3, the carcasses 110 and 112 may be conveyed through the chiller 10 while they are suspended above the ground just after they have been plucked and before they are eviscerated.

Turning to FIG. 5, chicken carcasses 110 and 112 are suspended by the chain line 100 below the terminal edges 34' and 44' and above the top surface 150 of the water in the reservoir 14, and the falling water cascades over the carcasses 110 and 112. The chain line 100 preferably extends entirely through the chiller 10, and the direction the line travels is from the inlet end 16 to the outlet end 18 (see FIGS. 1 and 2). Thus, carcasses are mounted to individual structures on a continuous loop chain that makes up the chain line 100, and this loop is driven through at least the chiller 10, and preferably the equipment that is upstream and downstream from the chiller 10. The chain line may be a conventional chain line that is well known in the poultry processing industry.

Because the chilled water cascades over the surfaces of the carcasses 110 and 112, and because the water is substantially cooler than the carcasses (preferably in the range of 32 to 50 degrees Fahrenheit), the temperature differential between them causes thermal energy to flow to the water from the surfaces of the carcasses, which results in the carcasses exiting the chiller 10 at a lower temperature than upon entry to the chiller 10. Due to the rate at which water cascades over the carcasses, the thermal transfer is rapid, particularly compared to the transfer to the same temperature water in which a carcass is merely submerged and/or slowly pushed through, as with a conventional bird chiller.

After cascading over the carcasses, the water flows into the reservoir 14, and may be taken up by one of the pumps 36 and 46 to cascade over the carcasses again. Alternatively, the water may flow out of the reservoir and be replaced as described herein. Some water may flow off of the carcasses after the chain line 100 has conveyed them beyond the outlet end 18 of the chiller 10. This water may fall onto the return plate 60 and return to the reservoir, or it may fall onto the floor or another structure outside of the chiller 10. Such water may be replaced through the pipe 70 mounted at the outlet end 18 of the chiller 10.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus for chilling plucked, substantially whole poultry carcasses that are held in a conveyor that transports a plurality of carcasses by suspending each carcass above a ground surface, the apparatus comprising:
   (a) a reservoir for holding a chilling liquid;
   (b) a first plenum disposed above the reservoir for receiving the chilling liquid from the reservoir;
   (c) a second plenum disposed above the reservoir for receiving the chilling liquid from the reservoir, wherein the second plenum is spaced from the first plenum by a gap that extends upwardly from the reservoir between and beyond the first and second plenums, and wherein the conveyor extends from a conveyor support above the apparatus through the gap; and
   (d) a chilling liquid pump in fluid communication with the reservoir and at least one of the plenums for pumping chilling liquid from the reservoir to said at least one of the plenums, wherein the chilling liquid is adapted to overflow out of the first and second plenums, cascade into the gap toward the conveyor, and flow into the reservoir.

2. The apparatus in accordance with claim 1, further comprising first and second waterfall plates that mount to facing edges of each of the plenums and extend toward the gap, wherein a lower edge of each waterfall plate defines a respective and opposite side of the gap.

3. The apparatus in accordance with claim 2, further comprising chilling liquid detectors mounted in the reservoir that sense the height of chilling liquid in the reservoir.

4. The apparatus in accordance with claim 2, wherein the reservoir is in fluid communication with chilling liquid that is in a machine at a location spaced from the apparatus.

5. An apparatus chilling plucked, substantially whole poultry carcasses that are held in a conveyor that transports a plurality of carcasses by suspending each carcass above a ground surface, the apparatus comprising:
   (a) a reservoir retaining a chilling liquid;
   (b) a first plenum disposed above the reservoir and receiving at least some of the chilling liquid from the reservoir;
   (c) a second plenum disposed above the reservoir and receiving at least some of the chilling liquid from the reservoir, wherein the second plenum is spaced from the first plenum by a gap that extends upwardly from the reservoir between and beyond the first and second plenums, and wherein the conveyor extends from a conveyor support above the apparatus through the gap; and
   (d) a chilling liquid pump in fluid communication with the reservoir and at least one of the plenums, the chilling liquid pump pumping chilling liquid from the reservoir to said at least one of the plenums, the chilling liquid overflowing out of the first and second plenums and cascading into the gap onto at least some of the plurality of carcasses and flowing into the reservoir.

6. The apparatus in accordance with claim 5, further comprising first and second waterfall plates that mount to facing edges of each of the plenums and extend toward the gap, wherein a lower edge of each waterfall plate defines a respective and opposite side of the gap.

7. The apparatus in accordance with claim 6, further comprising chilling liquid detectors mounted in the reservoir that sense the height of chilling liquid in the reservoir.

8. The apparatus in accordance with claim 6, wherein the reservoir is in fluid communication with chilling liquid that is in a machine at a location spaced from the apparatus.

9. A method for chilling plucked, substantially whole poultry carcasses that are held in a conveyor that transports a plurality of carcasses by suspending each carcass above a ground surface, the method comprising:
 (a) plucking at least one of the carcasses; and then
 (b) chilling said at least one carcass by passing through a chiller having:
   (i) a reservoir retaining a chilling liquid;
   (ii) a first plenum disposed above the reservoir and receiving at least some of the chilling liquid from the reservoir;
   (iii) a second plenum disposed above the reservoir and receiving at least some of the chilling liquid from the reservoir, wherein the second plenum is spaced from the first plenum by a gap that extends upwardly from the reservoir between and beyond the first and second plenums, and wherein the conveyor extends from a conveyor support above the apparatus through the gap; and
   (iv) a chilling liquid pump in fluid communication with the reservoir and at least one of the plenums, the chilling liquid pump pumping chilling liquid from the reservoir to said at least one of the plenums, the chilling liquid overflowing out of the first and second plenums and cascading downwardly into the gap onto said at least one carcass and flowing into the reservoir; and then
 (c) eviscerating said at least one carcass after the chilling step (b).

10. The method in accordance with claim 9, further comprising the step of drawing chilling liquid into the reservoir from an apparatus that cools the carcasses after evisceration.

11. A poultry processing system for carcasses that are held in a conveyor that transports multiple carcasses by suspending each carcass above a ground surface and transporting the carcasses along a path from an upstream position to a downstream position, the system comprising:
 (a) a plucking apparatus for removing substantially all feathers from at least one of the carcasses;
 (b) a chilling apparatus positioned along the path downstream of the plucking apparatus, the chilling apparatus having:
   (i) a reservoir retaining a chilling liquid;
   (ii) a first plenum disposed above the reservoir and receiving at least some of the chilling liquid from the reservoir;
   (iii) a second plenum disposed above the reservoir and receiving at least some of the chilling liquid from the reservoir, wherein the second plenum is spaced from the first plenum by a gap that extends upwardly from the reservoir between and beyond the first and second plenums, and wherein the conveyor extends from a conveyor support above the apparatus through the gap; and
   (iv) a chilling liquid pump in fluid communication with the reservoir and at least one of the plenums, the chilling liquid pump pumping chilling liquid from the reservoir to said at least one of the plenums, the chilling liquid overflowing out of the first and second plenums and cascading downwardly into the gap onto said at least one carcass and flowing into the reservoir; and then
 (c) an eviscerating apparatus positioned along the path downstream of the chilling apparatus, the eviscerating apparatus eviscerating said at least one carcass after the carcass has passed through the chilling apparatus.

12. The system in accordance with claim 11, further comprising a second chilling apparatus positioned along the path downstream of the eviscerating apparatus, wherein a fluid connection is formed between the second chilling apparatus and the chilling apparatus.

\* \* \* \* \*